United States Patent
Gandhi

(10) Patent No.: US 10,088,870 B2
(45) Date of Patent: Oct. 2, 2018

(54) MULTI-PORTION HOUSING OF A PORTABLE TERMINAL HAVING MULTIPLE BACK COVERS

(75) Inventor: Dinesh Gandhi, Brampton (CA)

(73) Assignee: Psion Inc., Mississauga (CA)

( * ) Notice: Subject to any disclaimer, the term of this patent is extended or adjusted under 35 U.S.C. 154(b) by 1037 days.

(21) Appl. No.: 12/765,949

(22) Filed: Apr. 23, 2010

(65) Prior Publication Data
US 2011/0211309 A1 Sep. 1, 2011

Related U.S. Application Data

(60) Provisional application No. 61/308,888, filed on Feb. 26, 2010.

(51) Int. Cl.
*H05K 7/00* (2006.01)
*G06F 1/16* (2006.01)

(52) U.S. Cl.
CPC .......... *G06F 1/1633* (2013.01); *G06F 1/1626* (2013.01); *Y10T 29/49002* (2015.01)

(58) Field of Classification Search
CPC .................................................... G06F 1/1656
(Continued)

(56) References Cited

U.S. PATENT DOCUMENTS 5,539,193 A    7/1996 Gibbs et al.
5,747,786 A *  5/1998 Cargin et al. ............ 235/462.46
(Continued)

FOREIGN PATENT DOCUMENTS

WO     2009/137925 A1    11/2009

OTHER PUBLICATIONS

Extended European Search Report dated Apr. 10, 2014 in counterpart European patent application 11153392.Mar. 1959.
(Continued)

*Primary Examiner* — Jerry Wu

(57) ABSTRACT

A variable form factor multi-portion housing of a handheld computer. The housing includes a first housing portion to provide a first interior for mounting a first electronic component, the first housing portion having a common first mating surface for facilitating coupling to a secondary housing portion. The housing includes the secondary housing portion having a version configuration of a first form factor selectable from a family of different version configurations having a plurality of different form factors contributing to a selectable variable form factor nature of the multi-portion housing, such that each of the version configurations from the family of different version configurations has a same second mating surface that is configured to couple to the common first mating surface. The first form factor of the secondary housing portion is configured to facilitate at least one of housing a portion of the first electronic component or housing at least a portion of a second electronic component that is interconnected with the first electronic component. Further, the secondary housing portion extends from an intermediate location (between proximal and distal ends) to the distal end of the first housing portion, such that the intermediate location is positioned on a bottom or top surface of the housing of the mobile terminal. The first and second housings also provide a majority of the internal space of the multi-portion housing.

9 Claims, 13 Drawing Sheets

(58) Field of Classification Search
USPC .............. 361/807–812, 679.01, 679.02,
361/679.55–679.59, 679.27; 455/325,
455/556.1, 550.1, 90.1, 575.1;
765/807–812, 679.01, 679.02,
765/679.55–679.59, 679.27
See application file for complete search history.

(56) References Cited

U.S. PATENT DOCUMENTS

| | | |
|---|---|---|
| 2005/0087603 A1 | 4/2005 | Koenck et al. |
| 2007/0075142 A1 | 4/2007 | Bellows et al. |
| 2010/0019044 A1* | 1/2010 | Mangaroo et al. ...... 235/462.47 |

OTHER PUBLICATIONS

Office Action from corresponding European Patent Application No. 11153392.3 dated Nov. 20, 2015.

* cited by examiner

MULTI-PORTION HOUSING OF A PORTABLE TERMINAL HAVING MULTIPLE BACK COVERS

FIELD OF THE INVENTION

This invention relates to modularity of a portable terminal.

BACKGROUND

As consumers increasingly rely on their mobile terminals, they desire to take their mobile terminals everywhere they go and have access to them at any time of day. As a result, today's mobile devices are frequently used in environments hostile to the mobile terminal's electronics. For example, a person who takes a cell phone, PDA, or similar device, to the beach risks harming the device by getting the device sandy or wet. Likewise, someone who works outdoors and is exposed to the elements may desire to have a mobile terminal that is water, dirt, and shock resistant. Accordingly, the sealing feature of a display of the mobile device and the device housing is important for the continued operational integrity of the device in the presence of hostile environments with undesirable foreign matter (e.g. water, other fluids, moisture, particulate matter, etc.).

It is also recognised that the length of a seal affects the durability of sealing It is recognised that the longer the seal length, the greater the risk of seal failure during rugged conditions experienced by a mobile terminal. However, longer seals also provide for larger openings between mating parts and therefore provide for greater access into an interior of the mobile terminal once the mating parts are disconnected. More improved sealing arrangements are required while retaining the ruggedness of the mobile terminal.

Further, today's handheld terminals have increasing needs for adaptability for providing an ever increasing degree of user functionality. In certain user requirements, housing reconfiguration potential is desired to flexibly adapt the handheld terminal to the changing user requirements while at the same time providing for durability of the housing to help protect the interior components of the handheld from shocks/impacts experienced by the housing. Accordingly, current handheld housings may not allow for easy removal (e.g., for replacement, repair, cleaning, alternative configuration of the terminal capabilities/functionality of the housed components), in particular for the optimum positioning of one or more antennas installed in the housing of the handheld terminal. As well, interior space in the housing of the handheld is typically at a premium, as today's users prefer the sleeker and smaller units. Ideally, today's users want smaller units with increased functionality, where sometimes these desires are conflicting in reality.

Further, handheld mobile computing devices have proliferated as their usefulness and functionality have improved. To the extent that the handheld device may be configurable or customizable for different classes of user, the utility the devices is enhanced. Handheld computers are available with various means of user input functionality. For example, touch screen displays may be especially desirable for applications where keyboard and mouse systems do not allow a satisfactory, intuitive, rapid, or accurate interaction by the user with the display's content. The touch screen enables a user to interact directly with the information displayed on the display screen, rather than indirectly in the case of a mouse or touchpad. For such classes of users, it is contemplated that a full functionality keyboard may not be necessary. Accordingly, such a class of user may prefer not to incur the cost of a full functionality keyboard, given their needs or applications for handheld computing.

The desire to have other different and/or increased functionality for handheld computers is also popular for different software applications, different types of communication hardware (e.g. antennas) for different jurisdictions, different types of scanners and other imagers (e.g. cameras, barcode readers, RFID readers, etc.), differing amounts of computing power and memory. Further, it is recognised that a change in functionality for one of the components of the handheld terminal (e.g. scanner functionality) may necessitate a change in another related component of the handheld computer. Incompatibility between mounting arrangements that the housing provides and the potential changes in component(s) functionality requires manufacturers to come out with new models incorporating these desired/required functionality changes, thus requiring the user to dispose of their current handheld and purchase a completely new handheld unit.

SUMMARY

It is an object of the present invention to provide a portable terminal housing for addressing at least one of the above presented disadvantages.

It would be advantageous for a manufacturer of handheld computers to provide a handheld computer having different variations of functionality suited to the needs of different classes of users, while maximizing commonality of other components of the handheld computer to facilitate decreased supply/manufacturing costs and inventories. It is also recognised that the length of a seal affects the durability of sealing It is recognised that the longer the seal length, the greater the risk of seal failure during rugged conditions experienced by a mobile terminal. However, longer seals also provide for larger openings between mating parts and therefore provide for greater access into an interior of the mobile terminal once the mating parts are disconnected. More improved sealing arrangements are required while retaining the ruggedness of the mobile terminal.

It is recognised that a change in functionality for one of the components of the handheld terminal (e.g. scanner functionality) may necessitate a change in another related component of the handheld computer. Incompatibility between mounting arrangements that the housing provides and the potential changes in component(s) functionality requires manufacturers to come out with new models incorporating these desired/required functionality changes, thus requiring the user to dispose of their current handheld and purchase a completely new handheld unit. Contrary to current housings, there is provided a variable form factor multi-portion housing of a handheld computer. The housing includes a first housing portion to provide a first interior for mounting a first electronic component, the first housing portion having a common first mating surface for facilitating coupling to a secondary housing portion. The housing includes the secondary housing portion having a version configuration of a first form factor selectable from a family of different version configurations having a plurality of different form factors contributing to a selectable variable form factor nature of the multi-portion housing, such that each of the version configurations from the family of different version configurations has a same second mating surface that is configured to couple to the common first mating surface. The first form factor of the secondary housing portion is configured to facilitate at least one of housing a portion of the first electronic component or housing at least a portion of a second electronic component that is interconnected with the first electronic component.

An advantage of a partial clamshell type mating configuration is that the length of a seal does not extend continuously around the entire periphery of a central frame (i.e. around the periphery of the central frame between a proximal and distal ends). It is recognised that the longer the seal length, the greater the risk of seal failure during rugged conditions experienced by the mobile terminal. A further advantage of a modified clamshell design of the housing portions is that positioning of the seal at the peripheries of the mated housing portions provides for increase/enhanced access into the interiors of the housing portions, once the housing portions are disassembled.

A first aspect provided is a variable form factor multi-portion housing of a handheld computer comprising: a first housing portion to provide a first interior for mounting a first electronic component, the first housing portion having a common first mating surface for facilitating coupling to a secondary housing portion; and the secondary housing portion having a version configuration of a first form factor selectable from a family of different version configurations having a plurality of different form factors contributing to a selectable variable form factor nature of the multi-portion housing, such that each of the version configurations from the family of different version configurations has a same second mating surface that is configured to couple to the common first mating surface; wherein the first form factor of the secondary housing portion is configured to facilitate at least one of housing a portion of the first electronic component or housing at least a portion of a second electronic component that is interconnected with the first electronic component.

A second aspect provided is a handheld computer having a variable form factor multi-portion housing comprising: a first housing portion to provide a first interior for mounting a first electronic component, the first housing portion having a common first mating surface for facilitating coupling to a secondary housing portion; and the secondary housing portion having a version configuration of a first form factor selectable from a family of different version configurations having a plurality of different form factors contributing to a selectable variable form factor nature of the multi-portion housing, such that each of the version configurations from the family of different version configurations has a same second mating surface that is configured to couple to the common first mating surface; wherein the first form factor of the secondary housing portion is configured to facilitate at least one of housing a portion of the first electronic component or housing at least a portion of a second electronic component that is interconnected with the first electronic component.

A third aspect provided is a method of assembling a handheld computer having a variable form factor multi-portion housing comprising: providing a first housing portion to provide a first interior for mounting a first electronic component, the first housing portion having a common first mating surface for facilitating coupling to a secondary housing portion; selecting the secondary housing portion having a version configuration of a first form factor from a family of different version configurations having a plurality of different form factors contributing to a selectable variable form factor nature of the multi-portion housing, such that each of the version configurations from the family of different version configurations has a same second mating surface that is configured to couple to the common first mating surface; wherein the first form factor of the secondary housing portion is configured to facilitate at least one of housing a portion of the first electronic component or housing at least a portion of a second electronic component that is interconnected with the first electronic component.

Further aspects provided are where the common first mating surface extends around a periphery of the first housing portion between an intermediate location and a distal end of the first housing portion, the intermediate location being between a proximal end and the distal end of the first housing portion, and the second mating surface extends around a periphery of the second housing portion between a proximal location and a distal end of the second housing portion. A resilient sealing member positioned between the first and second mating surfaces for inhibiting the ingress of foreign contaminants into the first interior and a second interior of the second housing portion. The first and second interiors form a majority of space in the mobile computer.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Portable Terminal 10

Figure 1:
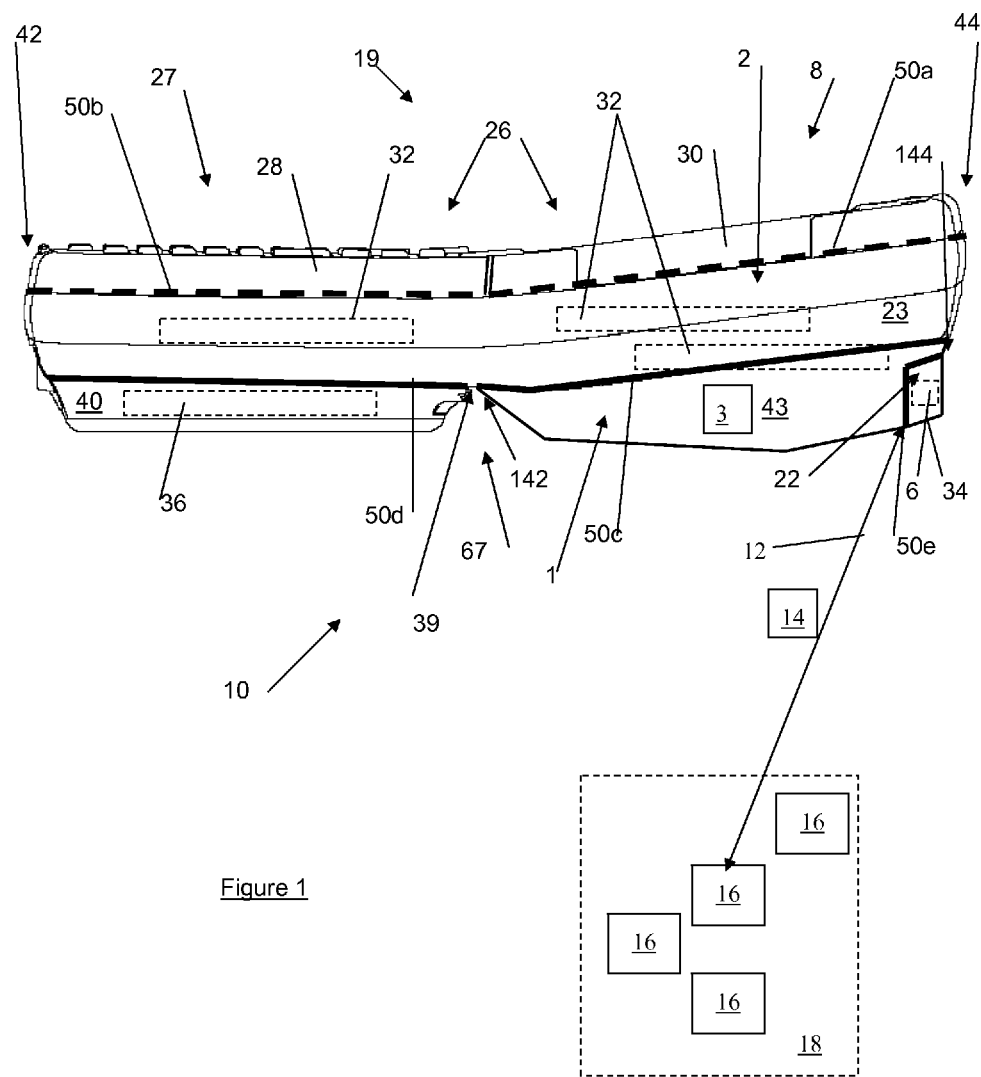
FIG. 1 is a side view of components in a multi-component housing of a portable terminal for interaction with a logistics environment.

Referring now more particularly to the accompanying figures, FIG. 1 illustrates an exemplary embodiment of a variable form handheld computer 10 having a modular multi-portion housing 8 including a common first housing portion 23 for coupling with different version configurations of a secondary housing portion 43. The variable form handheld computer 10 will be referred to variously and interchangeably as a handheld computer, a handheld device, a mobile computer, a mobile device or handheld computing device in the disclosure herein. The variable form handheld computer 10 may have the capability of communicating at least data, and possibly both data and audio, to and from servers as well as data acquisition sources within a communication network. The different version configurations of the secondary housing portion 43 can be selected from a family of secondary housing portions 43 having varying dimensional form factors, lengths, sizes (e.g. different interior 1 dimensions and/or volumes), mountings 3 for different types/functionality of component(s) 19, and/or mounting locations for optional third housing portion(s) 34. For example, it is recognised that one version of the secondary housing 43 can have a window and corresponding mountings 3 for accommodating an optical scanner 6 (e.g. barcode reader) while a different version of the secondary housing 43 can have only mountings 3 for a communications antenna 6. It is recognised that the radio antenna 6 (e.g. GPS, WAN, WiFi, etc.), the scanner 6 (e.g. imager, RFID, camera, etc.) and any other component 19 capable of emitting radiation (e.g. laser, radio waves, etc.) can hereafter be referred to as a data communications component 6, for sake of simplicity.

Further, it is recognised that the second component(s) 6, 19 housed at least partially in the interior 1 of the secondary housing 43 can be connected/coupled to other first component(s) 19 (e.g. user interface 26, battery 36, processor/memory 32, etc.) mounted in the first housing portion 23 of the housing 8 via one or more interconnections (e.g. flex cables, wires, or other connection means for communicating data and/or power between the first and second components 6, 19. The interconnected first and second components 6, 19 configured to operate cooperatively with one another to provide for overall functionality of the portable terminal 10. It is recognised that the different version configurations of the secondary housing portion 43 contribute to respective differences in the overall form factor of the housing 8

Referring again to FIG. 1, shown is a portable terminal 10 for providing imaging and/or scanning features (and/or functions) in data capture/communications 12 and asset tracking/management, for example in wireless communication 14 with tracking (e.g. information) objects 16 (e.g. barcode labels and/or RFID tags) present in one or more logistics environments 18 (e.g. industrial, retail, supply chain). It is recognised that the tracking objects 16 can be attached to products that are being transported from one location to another in the logistics environment 18. Examples of these environments 18 can include such as but not limited to: front store retail and/or warehousing for mobile stock checking, price checking, and merchandising; and utilities for meter reading, surveying, parking enforcement, and asset tracking.

It is also recognised that the portable terminal 10 can be configured for communications 12 with other portable terminals 10 as desired. Further, it is realized that in some cases, scanning/imaging may not be desired by the user (as functionality of the portable terminal 10) and therefore an appropriate configuration of a multi-portion housing 8 of the portable terminal 10 can be selected based on the user desires/requirements (e.g. the total volume of the multi-portion housing 8 can be reduced so as to accommodate the user's desire for a slimmer/smaller form factor of the mobile terminal 10 in view of the desired reduced functionality of a scanner less configuration.

One example for this change in mobile terminal 10 functionality is where the mobile terminal 10 could operated with added functionality (requiring a first configuration of the multi-portion housing—such as interior room to house a scanner for RFID reading) in a first environment (e.g. RFID warehouse) and the multi-portion housing can be reconfigured with reduced functionality (requiring a second configuration of the multi-portion housing—such as reduced interior room for scanner less operation) in a second environment (e.g. outside of the RFID warehouse during business travel, or in different warehouse situations using a different scanner type—e.g. barcode). Thus a change from one version (and housed component(s) 19) of a secondary housing portion 43 to a second version (and housed components) 19) of a differently configured secondary housing portion 43 can be used to modify both the functionality of the portable device 10 and the form factor of the housing 8 of the portable device 10.

The portable terminal 10 has the multi-portion housing 8 comprising a central housing portion 23, the secondary housing portion 43 (having different configuration versions—see FIGS. 9-12 by example), a battery cover 40, and an optional third housing portion 34. The multi-portion housing 8 is configured such that the third housing portion 34 can be coupled to the housing 8 via the second housing portion 43, as further described below. Also, it is recognised that the secondary housing portion 43 includes a mounting 3 (e.g. screws, snaps, rivets, adhesive or other fastening means as apparent to one skilled in the art) in the interior 1 to mount one or more respective components 19 therein (e.g. radio modules 32, additional memory/processors 32, scanners 32 and/or other communications devices such as antennas 6), such that the mounted component(s) 19 provide or otherwise contribute to the desired functionality (e.g. added/enhanced/modified) of the portable terminal 10 while the respective secondary housing portion 43 contributes to corresponding/desired form factor if the housing 8.

It is recognised that in the description, the terms "housing" and "enclosure" can be used interchangeably. Also, the housing 8 can include a battery cover 40 for housing a battery 36 or other power source for providing operational power to one or more components 19 of the portable terminal 10.

Figure 2:
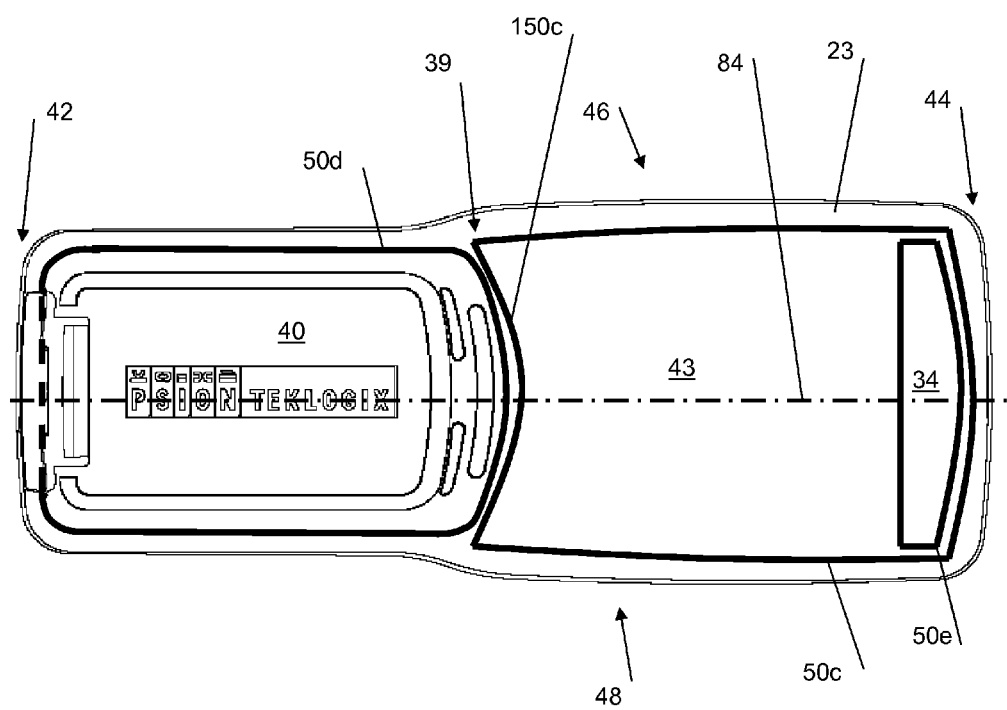
FIG. 2 is a bottom view of the portable terminal of FIG. 1.

Various example embodiments of the central housing portion 23 can be configurations such as but not limited to: a rigid body is composed of an integral rigid plastic body extending between proximal 42 and distal 44 ends; the rigid body is composed of a plastic body reinforced by one or more stiffening members (not shown) attached to the plastic body; and the rigid body is composed of a plurality of plastic components/segments rigidly connected to one another by mechanical and/or mechanical fastening means. The multi-portion housing 8 rigidity can be selected from the group comprising: torsional rigidity about the longitudinal axis 84 (see FIG. 2) extending between the proximal 42 and distal 44 ends and bending rigidity about the longitudinal axis 84 extending between the proximal 42 and distal 44 ends. It is also recognised that the central housing (also known as the first housing) portion 23 can be composed of one or more individual housings (e.g. a composite housing) and can provide rigidity, or not, to the multi-portion housing 8.

Further, the exterior dimensions (e.g. form factor) of the multi-portion housing 8 can be ergonomically configurable to be comfortable for operation of the portable terminal 10, based on the associated form factor and housed component(s) 19 of the selected version of the secondary housing portion 43. Further, different assembly processes for the various components into the housing 8 of the device 10 can use approximately configured sealing components 50a, b,c,d,e that are compatible with the assembly processes and configuration of the housing 8, in order to provide for protection of the component(s) 19 in the housing 8 interior against damage due to infiltration of foreign matter (e.g. dirt, moisture/fluid) into the interior from the external environment of the portable terminal 10.

The portable terminal 10 can have a number of components 19 including a user interface 26 located on a front surface 27, including a keyboard 28 and/or a display 30 (e.g. touch screen) for example, one or more onboard processors 32 (e.g. shown by ghosted lines as inside of the enclosure 23), and a scanner/radio communications module 32 (e.g. laser, WLAN with VoIP and Bluetooth, imager, RFID scanner, etc.—inside of the enclosure 23) coupled to an antenna 6 for facilitating wireless communication 14 and/or data capture 12. The radio module 32 and/or the antenna 6 can be mounted in the central housing 23, in the interior 1 of the secondary housing 43 via the mounts 3, and/or in an interior 22 of the third housing 34. The onboard power source 36 can be located on a back surface 67 for helping to satisfy power requirements of the onboard processor(s) 32, the user interface 26, and optionally the communication module 32, as well as any other component(s) 19 in general that are housed in the secondary 43 and/or optional third housing portion 34. Further, the housing 8 has the proximal end 42, the distal end 44, and a first side 46 and a second side 48 extending between the ends 42, 44.

It is recognised that one embodiment of the multi-portion housing 8 is where the first housing portion 23 remains consistent (e.g. the same) while accommodating different versions of the secondary housing portion 43 (i.e. combined form factor and housed component 19 functionality) via a common mating interface/surface 58 (see FIG. 5) configured for releasably securing any of the different secondary housing portions 43 to the first housing portion 23. In this embodiment, for example, the portable terminal 10 can use the same displays 30, keypad 28, battery 36 and first housing portion 23 for different versions (form factor and housed components 19, or lack thereof) of the secondary housing portion 43.

Components 19

Referring to FIG. 1, the electrical components of the portable terminal 10 can be components such as but not limited to: a main logic board (MLB) 32 or other printed circuit board(s) (PCB); radio modules 32 such as receivers/transmitters/transceivers for coupling to the antenna 6 (also referred to as a scanner 6, imaging device 6, etc.); UI devices 26 (e.g. keypad 28, display 30) and memory devices. For example, the MLB is the central printed circuit board (PCB) that, like a backplane, provides the electrical connections by which the other electrical components of the portable terminal 10 communicate and hosts the central processing unit and other subsystems housed in the central housing portion 23. The MLB can also contain a chipset which forms an interface between the CPU's front-side bus, main memory, and peripheral buses, non-volatile memory chips (usually Flash ROM in modern motherboards) containing the portable terminals 10 firmware or BIOS, a clock generator which produces the system clock signal to synchronize the various components, and/or slots for expansion ports that can be interfaced via the buses supported by the chipset.

The radio receiver/transmitter/transceiver 34 is one of the electrical components 19 that is connected to the antenna 6 via a feed line (not shown). The radio receiver/transmitter/transceiver 32 is an electronic circuit that receives and/or transmits its input/output from/to the antenna 6 via the feed line, uses electronic filters to separate any wanted radio signals 12 from all other signals 12 picked up by the antenna 6, amplifies the signals 12 to a level suitable for further processing, and finally converts through demodulation and decoding the signal into a form usable for the user of the portable terminal 10, such as sound (e.g. voice), pictures, digital data, measurement values, and/or navigational positions (e.g. GPS values) provided on the user interface 26.

Figure 7:
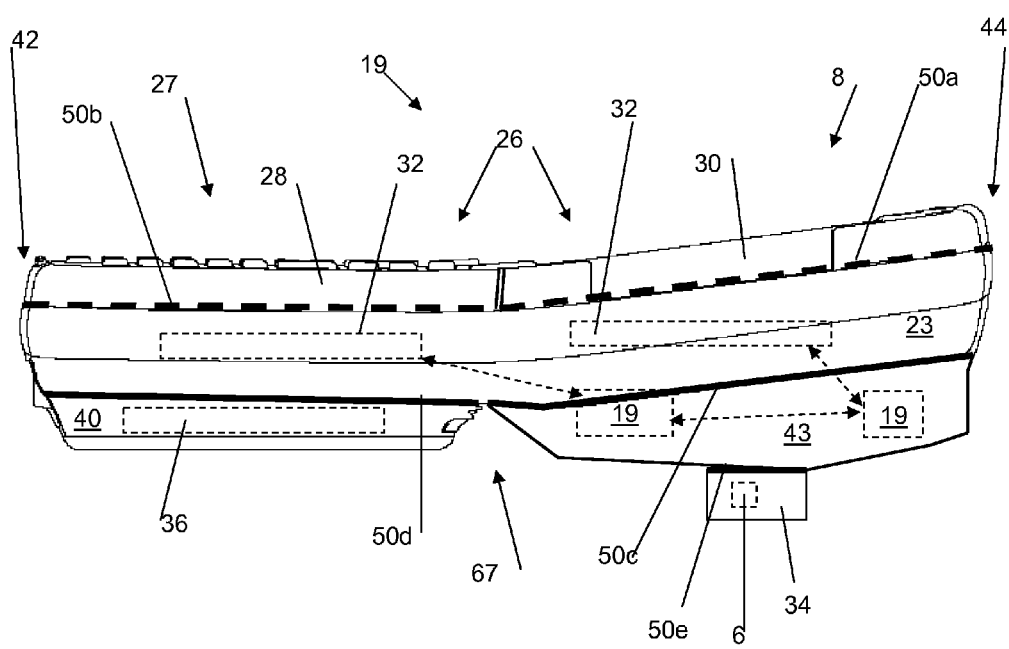
FIG. 7 is a still further embodiment of the third housing of FIG. 1.
Figure 8:
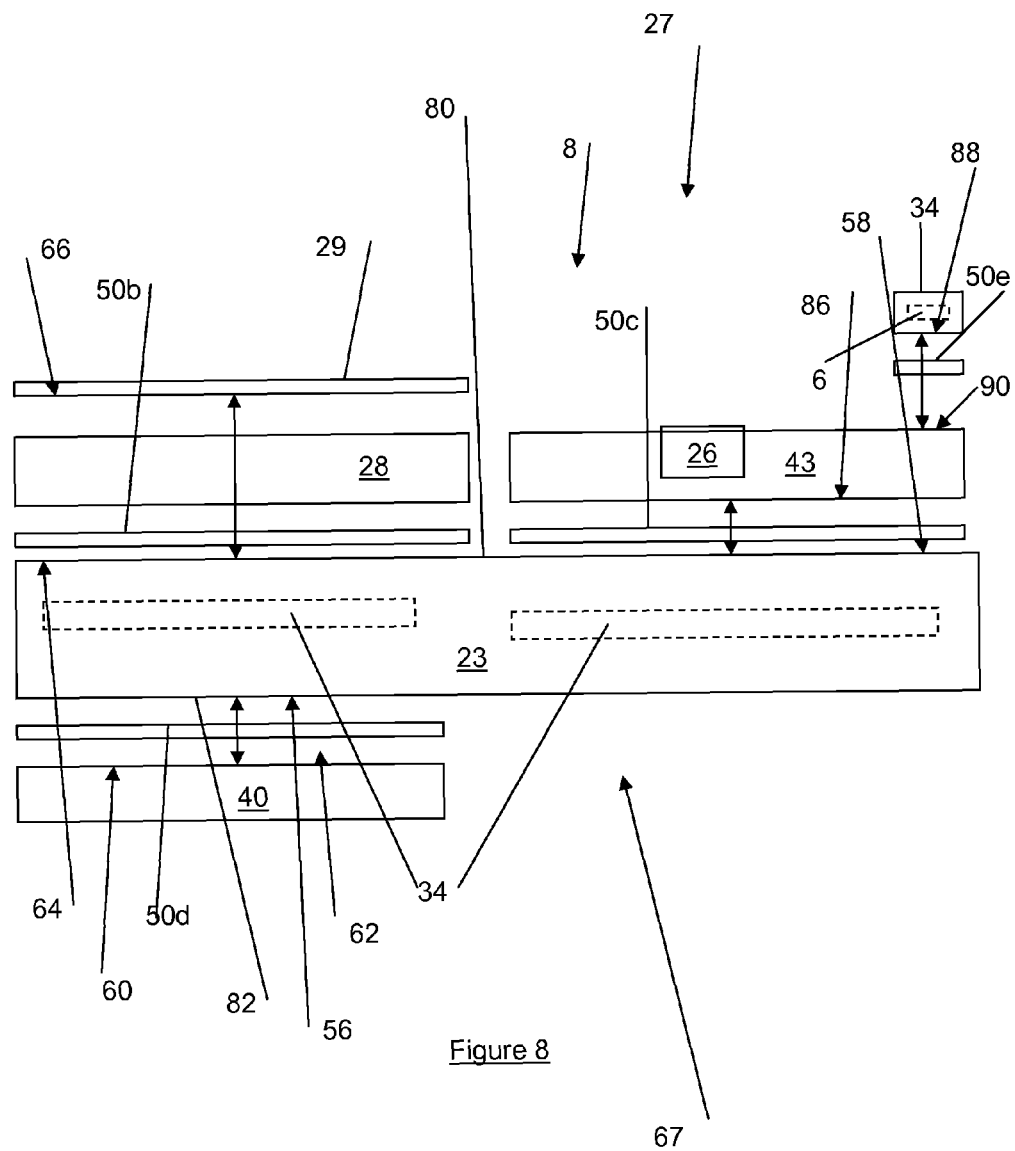
FIG. 8 is an alternative embodiment of multi-component housing of FIG. 5.
Figure 9:
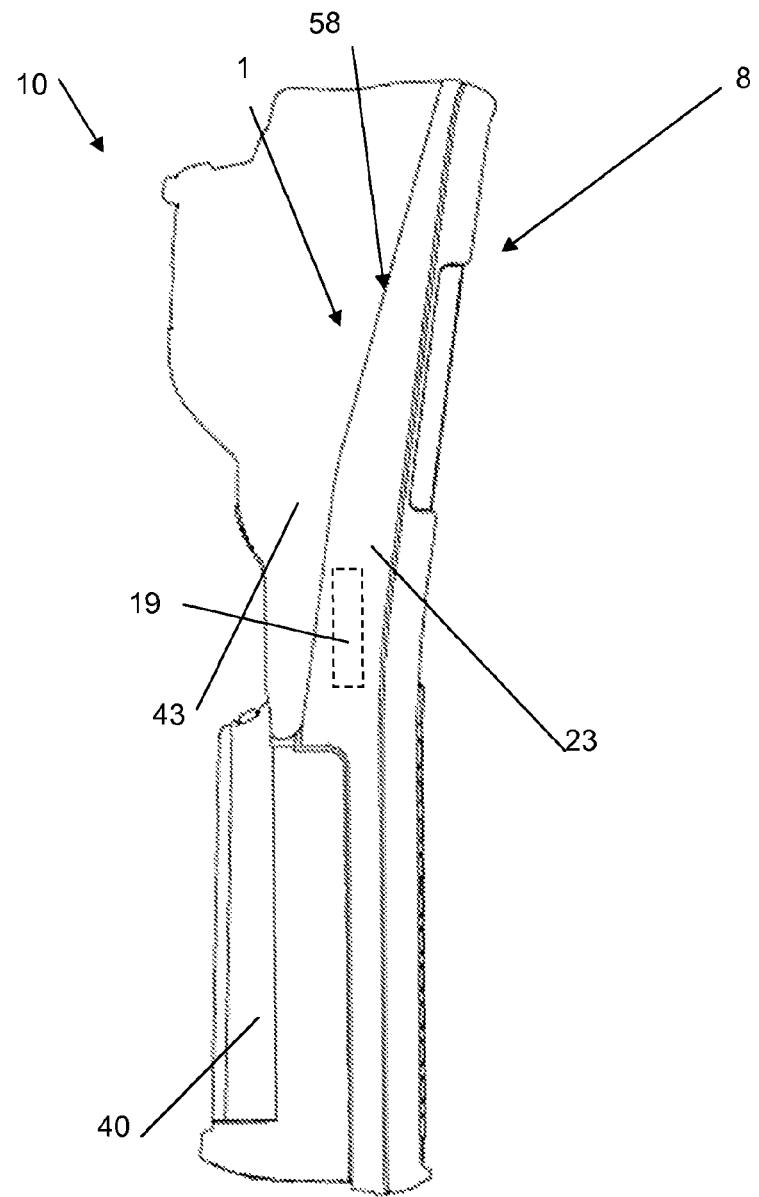
FIG. 9 is an alternative embodiment of the portable terminal of FIG. 1.
Figure 10:
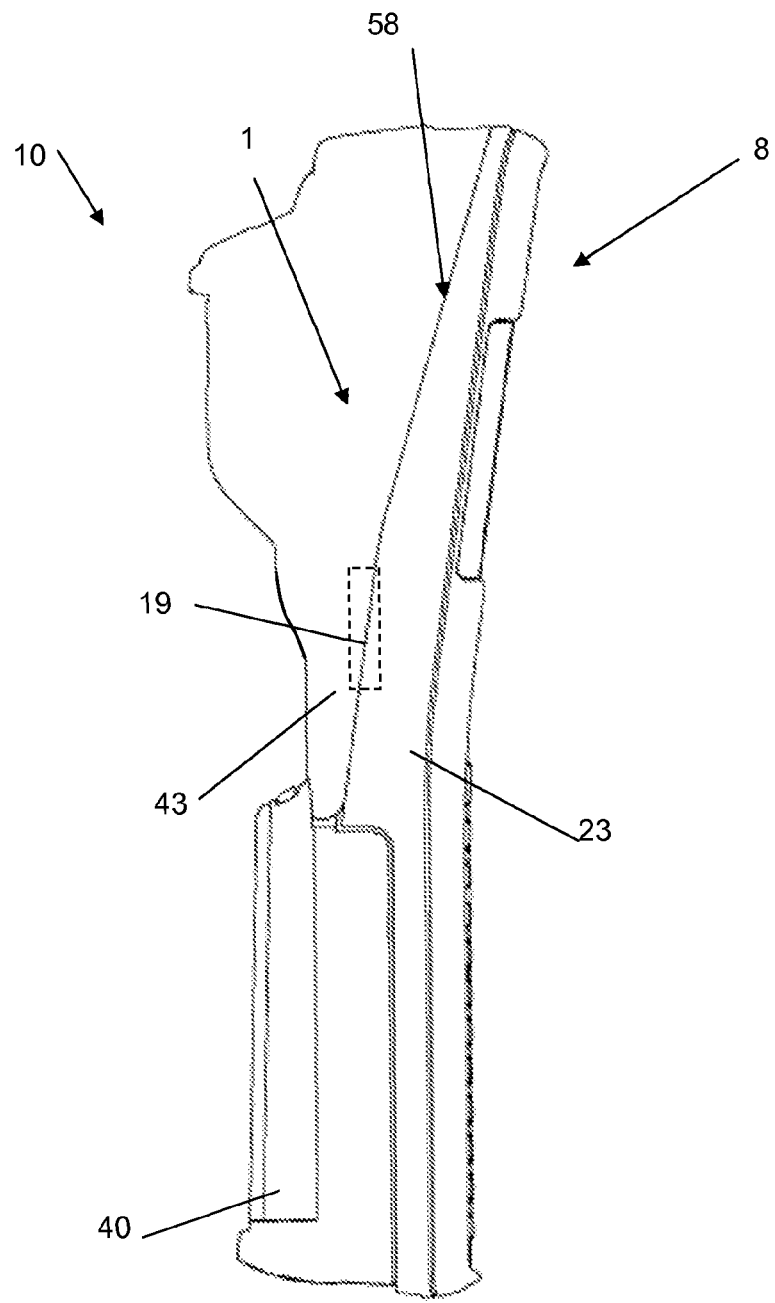
FIG. 10 is a further alternative embodiment of the portable terminal of FIG. 1.
Figure 11:
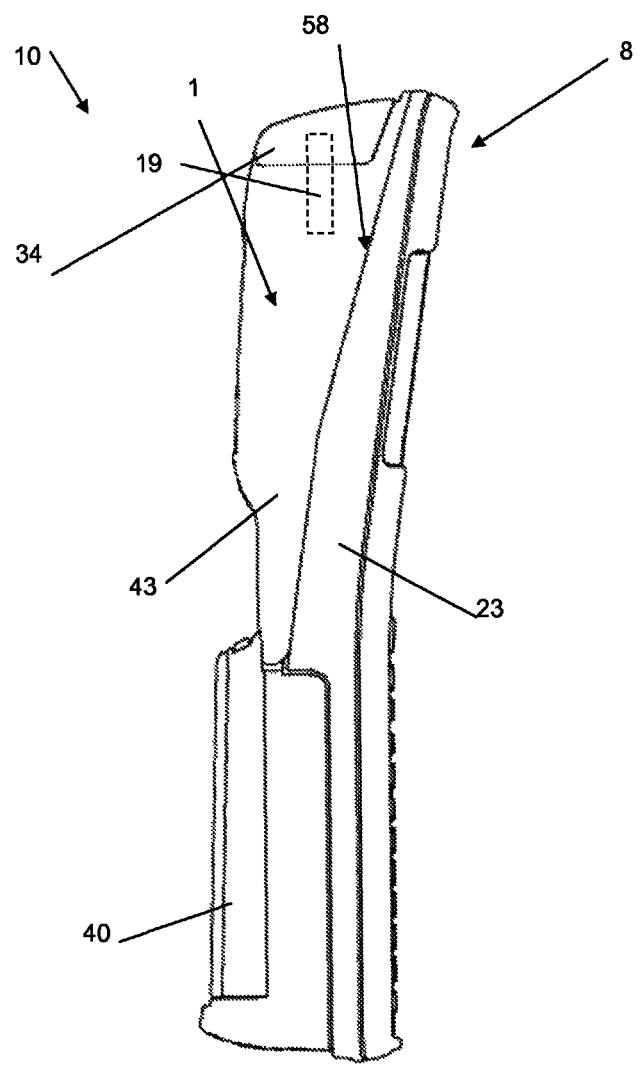
FIG. 11 is a still further alternative embodiment of the portable terminal of FIG. 1.
Figure 12:
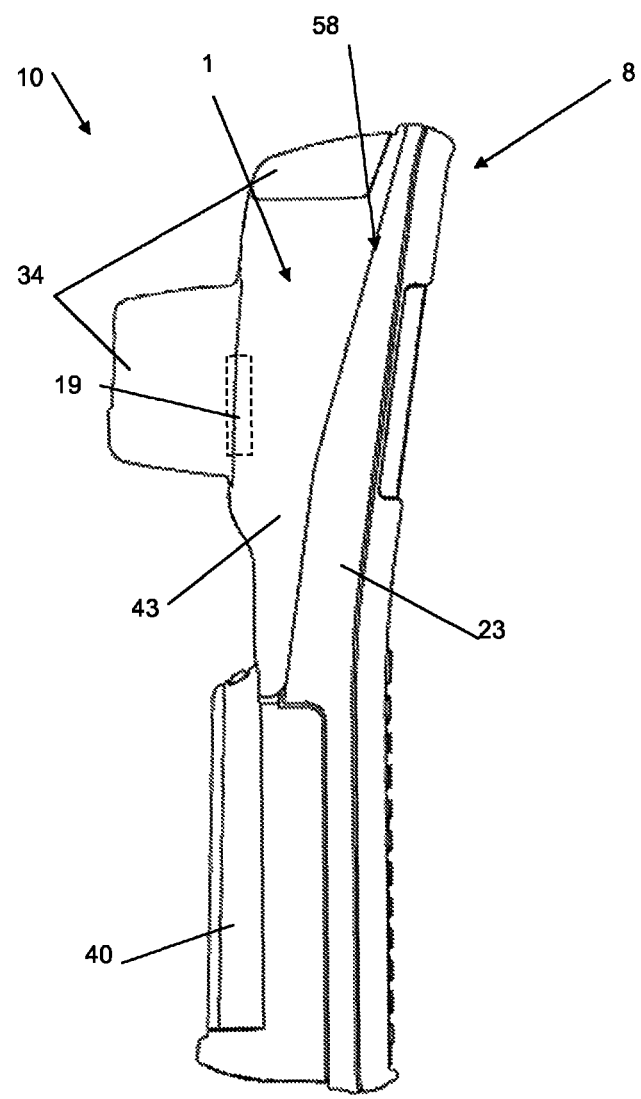
FIG. 12 is a still further alternative embodiment of the portable terminal of FIG. 1.

Referring to FIG. 1, the antenna 6 can have a physical form factor to make it possible to embed (i.e. into the interior of the housing 8). The handheld terminal 10 can have the antenna 6 coupled via the feed line to the battery 36 and a transceiver 32 (for example as a transmitter only for transmitting, a receiver only for receiving or combined as the transceiver for both transmission and reception of the signals 12), which are housed at least partially in the central housing portion 23 of the handheld 10 (e.g. in the housing portion 23 also containing the display 30 and/or keyboard 28). For example, the third housing portion 34 can be positioned on the distal end 44 of the handheld 10 as an endcap adjacent to the display 30 and/or the keypad 28. It is also recognised that the third housing portion 34 can be positioned on a backside (see FIG. 7) of the second housing portion 43 opposite the display 30 and/or the keypad 28. The third housing portion 34 has an interior 22 having one or more mounts for mounting the antenna 6 in the interior 22. It is recognised that the antenna 6 can be configured to function as a WAN, WIFI and/or Bluetooth communication technologies antenna 6 (e.g. non-directional based antennas), and/or as a directional antenna 6 (e.g. RFID scanner).

Alternatively, the antenna 6 can have a physical form factor to make it possible to embed (i.e. into the interior of the secondary housing 43). The handheld terminal 10 can have the antenna 6 coupled via the feed line to the battery 36 and a transceiver 32 (for example as a transmitter only for transmitting, a receiver only for receiving or combined as the transceiver for both transmission and reception of the signals 12), which are housed at least partially in the central housing portion 23 of the handheld 10 (e.g. in the housing portion 23 also containing the display 30 and/or keyboard 28). For example, the secondary housing 43 can be positioned adjacent to the distal end 44 of the handheld 10 as an back cover opposite to the display 30 and/or the keypad 28. The secondary housing 43 has the interior 1 having one or more mounts 3 for mounting the antenna 6 in the interior 1. It is recognised that the antenna 6 can be configured to function as a WAN, WIFI and/or Bluetooth communication technologies antenna 6 (e.g. non-directional based antennas), and/or as a directional antenna 6 (e.g. RFID scanner).

The portable terminal 8 can have the enclosure/housing 23 having the first interior 31 for housing (completely or at least partially within) a plurality of electronic components (e.g. components 32, 28, 30) and the secondary enclosure 43 (coupled to the primary enclosure 23) for housing the antenna 6 or other components 19 that do not fit entirely inside of the interior 31 of the central housing portion 23, such that these other components 19 may be mounted to the first housing portion 23 but extend into the interior 1 of the secondary housing portion 43. It is recognised that the antenna 6 can be completely enclosed (e.g. an internal antenna 6) in the interior 1 of the secondary enclosure 43 or can be partially enclosed in the interior 1, as desired. Further, it is recognised that the third enclosure 34 can have the interior 22 for housing (completely or at least partially within) a plurality of electronic components (e.g. components 32, 6) or other components 19 that do not fit inside of the interior 31 of the central housing portion 23 and/or within the interior 1 of the secondary housing portion 43. It is recognised that the antenna 6 (or other components 19) can be completely enclosed (e.g. an internal antenna 6) in the interior of the third enclosure 34 or can be partially enclosed in the interior 22, as desired.

Multi-Portion Housing 8

Figure 4:
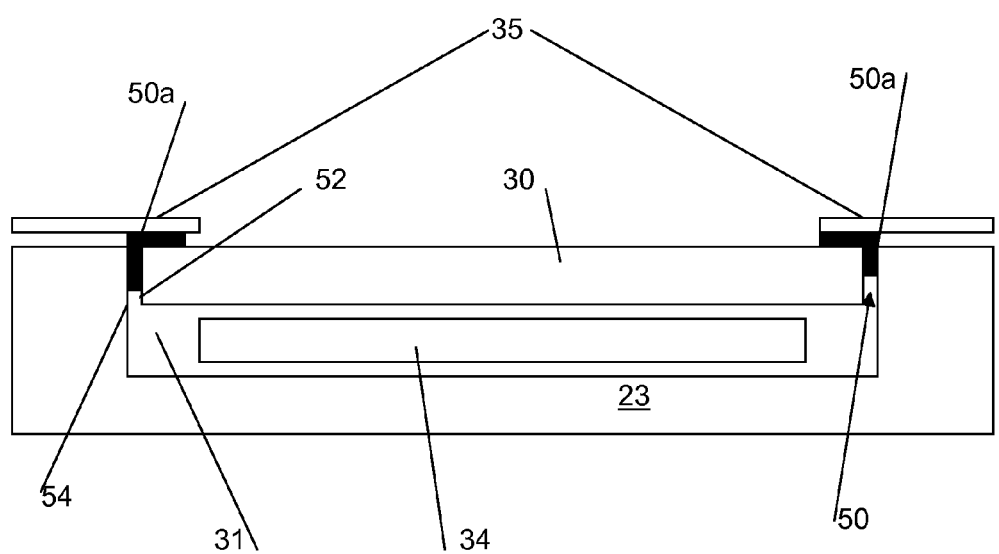
FIG. 4 shows a cross sectional A-A view of the terminal of FIG. 3.
Figure 5:
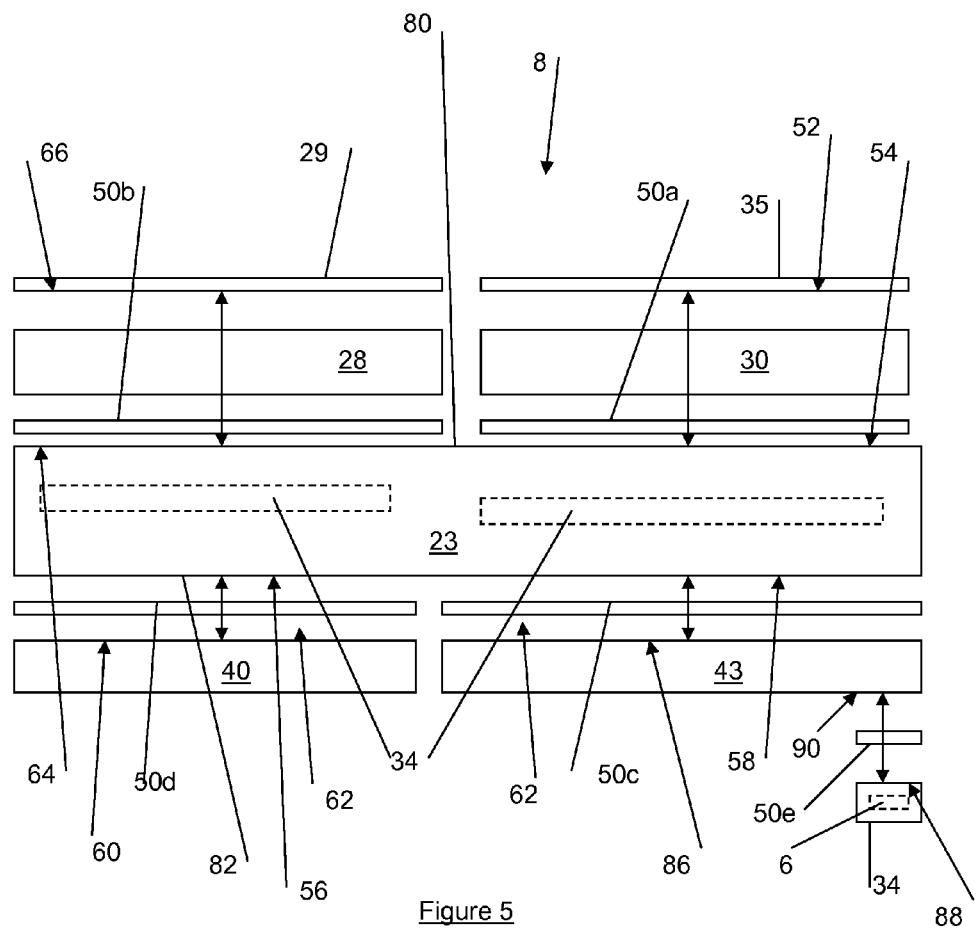
FIG. 5 is a block diagram of an example embodiment of the multi-component housing of FIG. 1.

Referring to FIG. 5, shown is an exploded view of the multi-portion housing 8 of the portable terminal 10. It is recognised that the multi-portion housing 8 has a central housing 23 that is configured to house the user interface 26 (e.g. keypad 28 and/or display 30) accessed by the terminal user by the front/top surface 27 of the terminal 10, such that at least a portion of the user interface 26 is housed within an interior of the central housing 23. The user interface 26 is associated with one or more seals 50a, 50b for inhibiting potential penetration of contaminant material (moisture, dirt, etc.) from the environment 18 into the interior 31 of the central enclosure 23 (see FIG. 4), via the interface region 50 (see FIG. 4) between the central housing 23 and the user interface 26 (e.g. display 30) mounted into the interior 31. The seal(s) 50a,b is/are positioned between a mating surface 52 of the user interface 26 and a corresponding mating surface 54 of the central housing 23 (and about a periphery of the mating surfaces 52,54), such that the seals 50a,b can be provided as a resilient gasket sandwiched between the mating surfaces 52,54 and either separate to or attached to the mating surfaces 52,54 (e.g. a resilient material formed or otherwise adhered to at least one of the mating surfaces 52,54). In the example shown, the mating surface 54 of the central housing 23 is in the interior 31, however, it is also recognised that the mating surface 54 can be on the front surface 27 (i.e. external surface of the central housing 23), as desired. The optional positioning of the seals 50a,b in the interior 31 of the central housing portion 23 is represented by the ghosted lines 50a,b, by example only.

Figure 3:
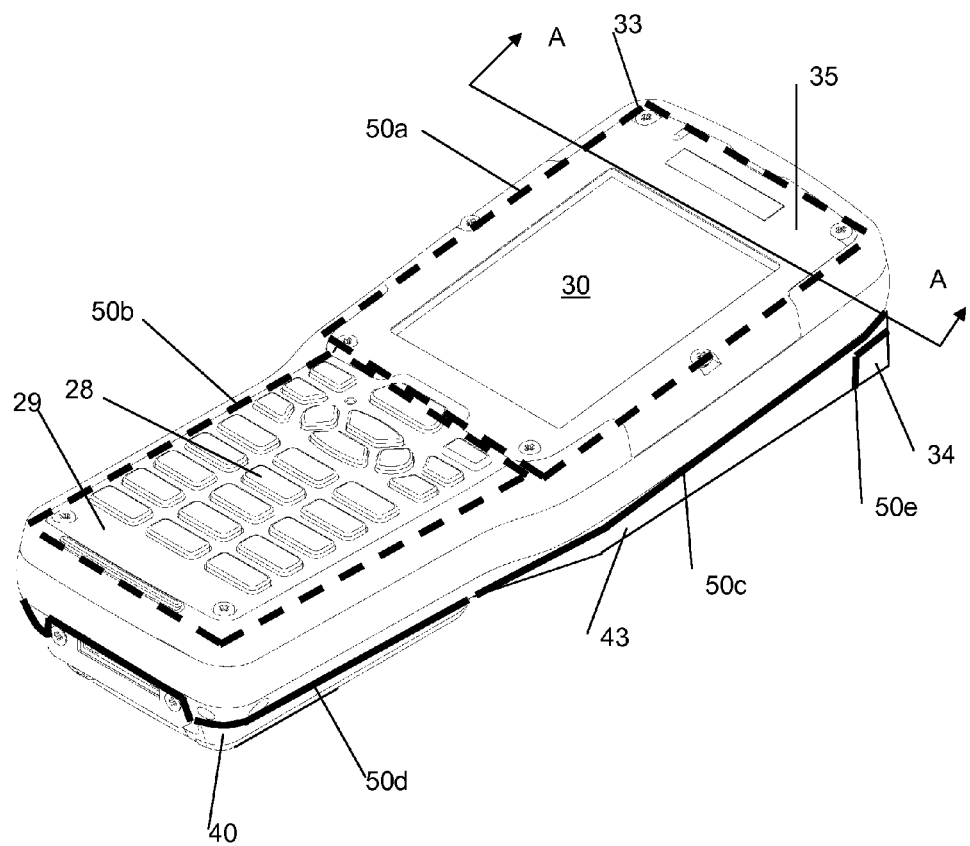
FIG. 3 is a proximal end view of the terminal of FIG. 1.

For example, the display 30 is coupled to the central enclosure 23 by a cover plate 35 connected (e.g. releasable) via a plurality of fasteners 33 (e.g. screws, snaps, rivets, adhesive or other fastening means as apparent to one skilled in the art), see FIG. 3 The display 30 is situated between the seal component 50a (e.g. a gasket) and a compartment in the interior 31 of the central enclosure 23 (see FIG. 4), such that the ingress of foreign matter (e.g. water, moisture, particulate matter, etc.) around the display 30 and into the interior 31 via the interface region 50 is inhibited by the seal component 50a.

For example, the keypad 28 is coupled to the central enclosure 23 by a cover plate 29 connected (e.g. releasable) via a plurality of fasteners 33 (e.g. screws, snaps, rivets, adhesive or other fastening means as apparent to one skilled in the art). The keypad 28 is situated between the seal component 50b (e.g. a gasket) and a compartment in the interior 31 of the central enclosure 23, such that the ingress of foreign matter (e.g. water, moisture, particulate matter, etc.) around the keypad 28 and into the interior 31 via the interface region is inhibited by the seal component 50b, positioned between a mating surface 66 of the cover plate 29 and/or keypad 28 itself and a corresponding mating surface 64 (inside the interior 31 and/or positioned on the front surface 27, as desired) of the central enclosure 23, see FIG. 5.

Referring again to FIG. 5, the central housing 23 optionally extends from the proximal end 42 to the distal end 44 of the multi-portion housing 8 to optionally act as a rigid or otherwise stiff spine or backbone of the multi-portion housing 8. The central housing 23 can provide resistance to impacts and/or other external forces (e.g. bending, torsional, etc. about a longitudinal axis 84 of the multi-portion housing 8—see FIG. 2) applied to or otherwise experienced by the multi-portion housing 8 of the portable terminal 10 during use by the user (e.g. in the event of hitting or otherwise dropping the portable terminal 10). The material of the central housing 23 can be composed of rigid plastic, metal, composite material, or a combination thereof, to impart the desired resistance to deformation of the central housing 23 due to external force(s) when applied to one or more portions (including the central enclosure 23) of the multi-portion housing 8. For example, the external force(s) can be experienced directly by the central enclosure 23 and/or indirectly via impact(s) experienced by the other attached portions (e.g. cover 40, back cover 43, end cap 34) of the multi-portion housing 8.

The central housing 23 also has a plurality of mating surfaces 56,58 configured for mating with the other enclosure portions of the multi-portion housing 8, such as the battery cover portion 40 and each of the different version configurations (e.g. form factor and/or associated provided functionality) of the back/second housing portion 43. It is recognised that in terms of the individual component 19 volume/spacing, the component 19 can be contained wholly in the interior of the first housing portion 23, wholly contained within the interior 1 of the second housing portion 43, wholly contained within the third housing portion 34, the component 19 volume/spacing can be shared between the interiors of the first 23 and second 43 housing portions, or the component 19 volume/spacing can be shared between the interiors of the third 34 and second 43 housing portions, as desired.

In any event, it is recognised that there can be interconnections (e.g. power and/or data communication—not shown) between various components 19 in the housing 8. For example, there can be an interconnection between a first component 19 housed (at least partially) in the first housing portion 8 and a second component 19 housed (at least partially) in the second housing portion 43, such that overall functionality of the portable terminal 10 is a combination of the first and second components 19 operating cooperatively with one another.

For example, the power source 36 (e.g. battery) is retained by the central enclosure 23 for use by the other components 19 (e.g. display 30, keypad 28, processor 32, radio modules 34, etc.) via the cover 40 that is coupled/attached to the enclosure 23 on the back/bottom surface 67, as either removable or as an integral part of the central enclosure 23. The battery 36 can be connected by an interconnection to one or more components 19 housed in the secondary housing portion 43. In the case of the cover 40 being removable from the central enclosure 23, the seal 50d is positioned between a mating surface 60 of the cover 40 and the corresponding mating surface 56 of the central enclosure 23 (e.g. positioned on the back surface 67). The seal 50d is configured for inhibiting potential penetration of contaminant material (moisture, dirt, etc.) from the environment 18 into the interior of the housing 8, via the interface region 62 between the central housing 23 and the cover 40 mounted on the back surface 67. The seal 50d is positioned between the mating surface 60 of the cover 40 and the corresponding mating surface 56 of the central housing 23, such that the seal 50d can be provided as a resilient gasket sandwiched between the mating surfaces 56,60 (and about a periphery of the mating surfaces 56,60) and either separate to or attached to one of the mating surfaces 56,60 (e.g. a resilient material formed or otherwise adhered to at least one of the mating surfaces 56,60).

Secondary Housing Portion 43

Referring again to FIG. 1, the housing portion 43 can provide an interior 1 and the central housing 23 can provide an interior 2, such that the interiors 1,2 are adjacent to one another to provide for a common interior space for the positioning of one or more components 19 that are common to both interiors 1,2. It is recognised that the majority of the interior space of the housing 8 is provided by the combination of the interior space 1 and the interior space 2. Further, the interiors 1,2 can provide an uninterrupted (i.e. devoid of internal partitions between the spaces 1,2) common interior space of the housing 8 or the interiors 1,2 can provide an interrupted (i.e. having one or more internal partitions between the spaces 1,2) common interior space with one or more electrical connections bridging the internal partition(s) between the interior spaces 1,2. In any event, it is recognised that the interior space 1 provides for expansion potential of the components 19 of the mobile terminal 10 concerning different component 19 configurations for different spatial configurations of the combined interiors 1,2 due to the usage of differently configured secondary enclosures 43 when coupled to the central enclosure 23.

Further, the secondary housing portion 43 extends from an intermediate location 39 (between the proximal 42 and distal 44 ends) to the distal end 44 of the central frame 23. In the present embodiment, the intermediate location 39 is positioned in the bottom surface 67 of the housing 8, however the intermediate location 39 could also be positioned on the top surface 27 of the housing 8 in the case where the secondary housing 43 is also positioned on the top/upper surface of the central housing 23.

It is recognised that the seal 50c is positioned between the mating surface 86 of the secondary housing 43 and the mating surface 58 of the central housing, such that the mating surface 86 extends around a periphery of the secondary housing 43 and the mating surface 58 extends around a periphery of the central housing between the intermediate location 39 and the distal end 44. It is recognised that the configuration of the mating surfaces 58 and 86 provide for a modified clamshell (which can be provided as unhinged between the housings 23,43 or can be provided as hinged between the housings 23,43) type mating between the housings 23,43, however the modified clamshell mating is configured as between the peripheral mating surface 86 of the secondary housing 43 extending between a proximal end 142 and a distal end 144 of the secondary housing 43 and the peripheral mating surface 58 of the central housing 23 extending between the intermediate location 39 and the distal end 44 (i.e. in a half or partial clamshell type mating between the two enclosures 23,43). The mating surfaces 58 and 86 are closed shapes to inhibit with the interposed sealing member 50c the ingress of foreign matter into the interiors 1,2. Further, in reference to FIG. 2, a portion 150c of the seal 50c extends from one side 46 to the other side 48 of the first housing portion 23 in the intermediate location 39, as does the corresponding mating surfaces 58,86 (see FIG. 5), such that the remainder of the seal 50c (and corresponding mating surfaces 58,86 extend about the peripheries of the respective housing portions 23, 43 (i.e. for portion 23 about the periphery between the intermediate location 39 and the distal portion 44, and for the portion 43 between the proximal 142 and distal 144 portions).

An advantage of the partial clamshell type mating configuration is that the length of the seal 50c does not extend continuously around the entire periphery of the central frame 23 (i.e. around the periphery of the central frame 23 between the proximal 42 and distal 44 ends). It is recognised that the longer the seal length, the greater the risk of seal failure during rugged conditions experienced by the mobile terminal 10. A further advantage of the modified clamshell design of the housing portions 23,43 is that positioning of the seal 50c at the peripheries of the portions 23,43 provides for increase/enhanced access into the interiors 1,2 once the housing portions 1,2 are disassembled.

The different version configurations of the secondary housing portion 43 are each coupled/attached to the enclosure 23 on the back/bottom surface 67 (e.g. as removable) of the central enclosure 23. In the case of the housing portion 43 being removable from the central enclosure 23, the seal 50c is positioned between a mating surface 86 of the housing portion 43 and the corresponding mating surface 58 of the central enclosure 23 (e.g. positioned on the back surface 67). The seal 50c is configured for inhibiting potential penetration of contaminant material (moisture, dirt, etc.) from the environment 18 into the interior of the housing 8, via the interface region 62 between the central housing 23 and the housing portion 43 mounted on the back surface 67. The seal 50c is positioned between the mating surface 86 of the housing portion 43 and the corresponding mating surface 58 of the central housing 23, such that the seal 50c can be provided as a resilient gasket sandwiched between the mating surfaces 86,58 (and about a periphery of the mating surfaces 86,58) and either separate to or attached to one of the mating surfaces 86,58 (e.g. a resilient material formed or otherwise adhered to at least one of the mating surfaces 86,58).

Third Housing Portion 34

The optional third housing portion 34 can be coupled/attached to the second housing 43 (e.g. as removable). In the case of the housing portion 34 being removable from the housing portion 43, the seal 50e is positioned between a mating surface 90 of the housing portion 43 and the corresponding mating surface 88 of the third housing portion 34. The seal 50e is configured for inhibiting potential penetration of contaminant material (moisture, dirt, etc.) from the environment 18 into the interior of the housing 8, via the interface region between the housing portions 34, 43 mounted on the back surface 67. The seal 50e is positioned between the mating surface 88 of the housing portion 43 and the corresponding mating surface 90 of the second housing 43, such that the seal 50e can be provided as a resilient gasket sandwiched between the mating surfaces 88,90 (and about a periphery of the mating surfaces 88,90) and either separate to or attached to one of the mating surfaces 88,90 (e.g. a resilient material formed or otherwise adhered to at least one of the mating surfaces 88,90).

One of the reasons for the central housing portion 23, the secondary housing portion 43, and optionally the third housing portion 34, is modularity, as different portions of the housing 8. Customers have the potential to remove a pod (third housing portion 34) or endcap (third housing portion 34) and replace it with another version having of same having different interior spacing and/or internal mounting configurations for different respective terminal modules that are appropriate to new/expanded particular functionality of the terminal 10 as desired by the customer/user of the terminal 10. Further, customers have the potential to remove a first cover version (secondary housing portion 43) and replace it with another version having different interior 1 spacing and/or internal mounting configurations 3 for different respective terminal component(s) 19 that are appropriate to new/expanded particular functionality of the terminal 10 as desired by the customer/user of the terminal 10. For example, if a customer has a laser barcode scanner and they wish to replace it with a imager scanner, they could undo the attachment mechanism between the housing portions 23,43,34 (e.g. four screws) and replace the appropriate housing portion 43 or likewise optionally for the portion 34. So, the customer can view the portion 43 and the portion 43 and optional portion 34 as modules which can be replaced/exchanged easily with respect to the central portion 23, in order to provide for different form factors of the housing 8 and/or functionality in cooperation with other component(s) 19 of the other housing portions 23,34,40. Accordingly, functionality and form factor of the terminal 10 can be modified (e.g. expanded, changed) by exchanging/adding the appropriate secondary 34 and/or third housing 43 portions on the common central/first housing portion 23.

Seal 50a,b,c,d,e

The seal component 50a,b,c,d,e is made of a resilient material for facilitating a compression of the sealing component between the appropriate mating surfaces of: the central housing portion 23 and the secondary housing portion 43; the secondary housing portion 43 and the third housing portion 34; and between the battery cover 40 and the central housing portion 23.

The seal component 50a,b,c,d,e is designed for interaction with the corresponding mating surfaces of the components 19, the secondary cover 43, the tertiary cover 34, and the surfaces 54,56,58,64 of the central housing 23 to provide a selected degree of protection against the intrusion of solid objects (including body parts like hands and fingers), dust, accidental contact, and water in electrical enclosures, for example the interior 1 of the secondary enclosure 43, the interior 22 of the tertiary enclosure 34, and the interior 2 of the central enclosure/housing/frame 23. One example of a measure degree of ingress protection is the IP Code (or International Protection Rating), sometimes also interpreted as Ingress Protection Rating) consists of the letters IP followed by two digits and an optional letter.

The material of the seal component 50a,b,c,d,e is made of resiliently flexible material, such as but not limited to: rubber; a rubber derivative; an elastomeric material; and other suitable polymers as would be apparent to one skilled in the art, for facilitating the seal between mating housing 8 portions for inhibiting the penetration of foreign contaminant material from the logistics environment 18 into the interior of the multi-portion housing 8 of the portable terminal 10 (i.e. in the interior of the central housing portion 23, in the interior of the secondary housing portion 43, in the interior of the third housing portion 34 (e.g. endcap), and/or in the interior of the battery cover 40 covering a battery compartment for the battery 36.

Accordingly, in view of the above, the configurable multi-portion housing 8 for the portable terminal 10 can have the proximal end 42, the distal end 44, a bottom surface 67, and the top surface 27, the top surface 27 configured for mounting the user interface 26 between the proximal 42 and distal ends 44. The multi-portion housing 8 can comprise: the central/first housing portion 23 (e.g. providing a rigid body) extending between the proximal 42 and distal 44 ends (e.g. for facilitating rigidity of the multi-portion housing 8 to inhibit deformation) of the multi-portion housing 8, the central housing portion 23 having an upper surface 80 and an opposing lower surface 82 (see FIG. 5). The selected version configuration of the second housing portion 43 (with or without housed component(s) 19 for interconnecting and operating in conjunction with the other component(s) 19 of the portable terminal 10) can be secured (e.g. releasably via mechanical fasteners such as screws, clips, etc.) to the central/first housing portion 23 and can have the first resilient seal 50c positioned between a first mating surface 86 of the second housing portion 43 and a corresponding mating surface 58 of the central housing portion 23, the corresponding mating surface 58 of the central housing portion 23 extending only partway between the proximal 42 and distal 44 ends and being positioned on either the upper 80 or the lower 82 surface. The optional third housing portion 34 can be secured (e.g. releasably via mechanical fasteners such as screws, clips, etc.) to the selected version of the second housing portion 43 and have a second resilient seal 50e positioned between a second mating surface 90 of the second housing portion 43 and a corresponding mating surface 88 of the third housing portion 34. The first resilient seal 50c and the second resilient seal 50e are configured for inhibiting penetration of foreign contaminants into the interior of the multi-portion housing 8. It is also recognised that the particular form factor and/or configuration of the secondary housing portion 43 can be used to accommodate a particular third housing portion 34 configuration.

Figure 6:
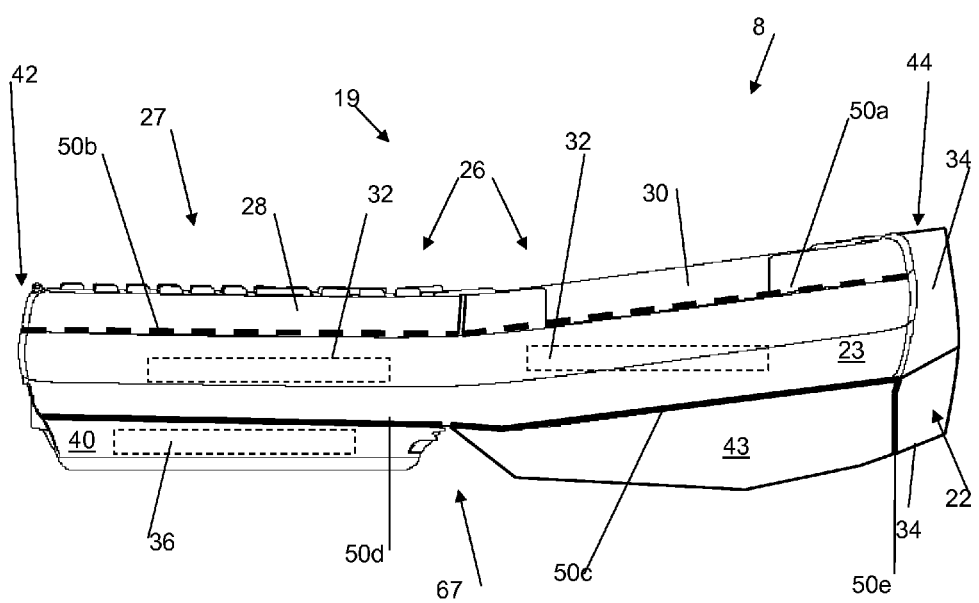
FIG. 6 is a further embodiment of the third housing of FIG. 1.

Further to the above, referring again to FIGS. 1,2,3,4,5, the corresponding mating surface 58 of the central housing portion 23 is positioned on the lower surface 82. At least a portion of the upper surface 80 provides the top surface 27 for the user interface 26 (e.g. for mounting the keypad 28). The second mating surface 90 of the selected version configuration of the second housing portion 43 can be positioned adjacent to the distal end 44. Further, at least a portion of the user interface 26 can be positioned in an interior of the central housing portion 23 and away from the distal end 44. The multi-portion housing 8 can include a mounting in the interior 22 of the third housing portion 34 for mounting at least one of an antenna 6 or a radio module 32 coupled to the antenna 6 configured for providing information to the user interface 26. The optional third housing portion 34 can project outwardly from the distal end 44 of the central housing portion 23, as shown in FIG. 6. The corresponding mating surface 90 for the third housing portion 34 can be positioned between the proximal 42 and distal 44 ends. The corresponding mating surface 90 for the third housing portion can be positioned at the distal end 44.

Further, the multi-portion housing 8 can include a fourth housing portion 34 secured to the selected version configuration of the second housing portion 43 and having a third resilient seal 50e positioned between a third mating surface 90 of the second housing portion 43 and a corresponding mating surface 88 of the fourth housing portion 34, the third mating surface 88 located away from the distal end 44. In this case, the selected version configuration of the secondary housing 43 includes mounting surfaces for two or more different additional housing portions 34.

Alternative Embodiment of the Multi-Portion Housing 8

Referring to FIGS. 1,6,7,8, an alternative embodiment of the multi-portion housing 8 is such that the corresponding mating surface 58 of the central housing portion 23 is positioned on the upper surface 80 and at least a portion of the top surface 27 is provided by the selected version configuration of the second housing portion 43. Further, the corresponding mating surface 58 of the central housing portion 23 is positioned on the upper surface 80 of the central housing portion 23 and at least a portion of the top surface 27 is provided by the central housing portion 23. Further, the corresponding mating surface 58 of the central housing portion 23 is positioned adjacent to the distal end 44. It is also recognised that at least a portion of the user interface 26 can be positioned in an interior of the second housing portion 43 and away from the second mating surface 90 used to couple the third housing portion 34 to the multi-portion housing 8. In this manner, the selected version configuration (e.g. form factor including mountings 1) of the secondary housing portion 43 can be chosen so as to accommodate the mounting requirements and/or the volume/spacing requirements of the user interface 26 housed at least partially in the interior 1 of the secondary housing portion 43.

Referring to FIGS. 9,10,11,12, shown are different respective version configurations of the secondary housing portion 43 coupled via the common interface 58 to the first housing portion 23. It is recognised that the different version configurations of the secondary housing portion 43 provide for corresponding different functionality (e.g. of component(s) 19 housed at least partially in the interior 1 of the housing portion 43).

In view of the above, it is considered that there is provided a variable form housing frame 8 of the handheld computer 10, the variable form housing frame 8 configurable using different version configurations of a secondary housing 43 coupled to a first housing 23 via a common mating surface 58 positioned on the first housing 23. The variable form housing frame 8 is configured to house a plurality of handheld computing modules/components 19, the plurality of handheld computing modules/components 19 including for example a user interface module 26, a circuitry/processor module 34, a battery module 36; and one or more data components 6, wherein the components 19 can be wholly housed within one of the housing portions 23,43 and/or shared between each of the interiors of the housing portions 23,43.

In addition to providing increased customer choices within a given and familiar handheld computer platform 8, by maximizing commonality of components 19, a manufacturer is able to minimize the number of different input raw materials needed, positively impacting manufacturing expenses. Such a solution would also enable late-stage customization of handheld computers 10 having housings 8 of different form factors (as provided by the different version configurations of the secondary housing 43) during the manufacturing assembly process of the handheld computer 10. Providing such late-stage customization or configuration capability of the handheld computer 10 also positively affects the component inventory carrying costs for inventory that a manufacturer needs to have on hand to support manufacturing assembly and production of differing versions or families of handheld computers 10. For example, the majority of the components 19 contained in the first housing 23 can remain the same for different version configurations of the secondary housing 43 and the housed/mounted components 19 at least partially within the interior 1.

The microprocessor(s) 32, in addition to its/their operating system functions, enables execution of software applications on the handheld device 10. A variable set of applications, which control basic device operations, may be installed on the handheld device 10 during its manufacture, depending upon the component(s) 19 housed in the first housing portion 23 and the component(s) 6, 19 housed by the selected version configuration of the secondary housing portion 43. These basic operations typically include data and voice communication applications, for example. Additionally, applications may also be subsequently loaded onto the handheld device 10 through a communication subsystem 32, an auxiliary I/O subsystem 32, serial port 32, USB port 32, short-range communications subsystem 6, or any other suitable subsystem 32, and installed by a user in RAM 32, or the persistent store 32, for execution by the microprocessor 32. Such flexibility in application installation increases the functionality of the handheld device 100 and may provide enhanced on-device features, communication-related features, or both.

Still with regard to FIGS. 9-12, the various different version configurations of the secondary housing 43 provide for severability and reuse of display screen module 30 and/or keypad 28, battery module 36 and circuitry modules 32 of the first housing portion 23 during repair of the various models comprising the family of handheld computers, enhancing the practicability and economics of replacing individual components or modules.

Assembly Operation 100

Figure 13:
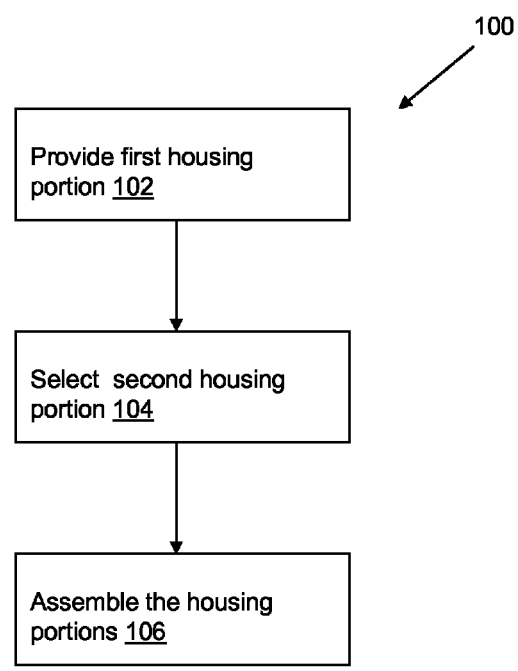
FIG. 13 shows an example manufacturing process for assembling the portable terminal of FIG. 1.

Referring to FIGS. 1, 13, shown is a method 100 of assembling the handheld computer 10 having the variable form factor multi-portion housing 8. At step 102 the manufacturing facility/equipment (not shown) provides a first housing portion 23 to provide a first interior for mounting a first electronic component 19, the first housing portion 23 having a common first mating surface 58 for facilitating coupling to a secondary housing portion 43. At step 104, selecting the secondary housing portion 43 to have a version configuration of a first form factor from a family of different version configurations having a plurality of different form factors contributing to a selectable variable form factor nature of the multi-portion housing 8, such that each of the version configurations from the family of different version configurations has a same second mating surface that is configured to couple to the common first mating surface 58. The first form factor of the secondary housing portion 43 is configured to facilitate at least one of housing a portion of the first electronic component 19 or housing at least a portion of a second electronic component 19 that is interconnected with the first electronic component 19. At step 106, the housing portions 23,43 are coupled to one another (e.g. releasably secured).

I claim:

1. A variable form factor multi-portion housing of a mobile computer comprising: a first housing portion to provide a first interior for mounting a first electronic component, the first housing portion having a common first mating surface; a secondary housing portion selectable from a family of different secondary housing portions of different volumes, each of the different secondary housing portions of the family of different secondary housing portions having a same second mating surface that is designed configured to couple to the common first mating surface, the secondary housing portion designed being configured to facilitate at least one of housing a portion of the first electronic component and housing at least a portion of a second electronic component that is interconnected with the first electronic component, the secondary housing portion being releasably secured to the first housing portion; and a resilient seal positioned between the common first mating surface and the second mating surface of the secondary housing portion, the resilient seal configured to inhibit penetration of foreign contaminants into the interior of the multi-portion housing; and a third housing portion, the third housing portion releasably secured to the secondary housing portion.

2. The multi-portion housing of claim 1, wherein the second electronic component is housed in the secondary housing portion and is a data communications component configured to operate with the first electronic component.

3. The multi-portion housing of claim 1, wherein the first electronic component is a user interface.

4. The multi-portion housing of claim 2, wherein the data communications component is a scanner.

5. The multi-portion housing of claim 1, wherein the first and second electronic components are designed to operate cooperatively to contribute to an overall functionality of the handheld computer.

6. The multi-portion housing of claim 1, wherein the first housing portion facilitates rigidity of the multi-portion housing to inhibit deformation of the multi-portion housing, the first housing portion having an upper surface and an opposing lower surface and extending between a proximal end and a distal end of the multi-portion housing.

7. The multi-portion housing of claim 1, wherein the third housing portion is releasably secured to the secondary housing portion using a second resilient seal positioned between a mating surface of the secondary housing portion and a mating surface of the third housing portion, the second resilient seal configured to inhibit penetration of foreign contaminants into the interior of the multi-portion housing.

8. The multi-portion housing of claim 6, wherein the first housing portion further comprises another mating surface on the upper surface to facilitate housing of a portion of a user interface in an interior of the first housing portion.

9. The multi-portion housing of claim 6, wherein the common first mating surface is on the lower surface to designate the secondary housing portion as a back cover of the multi-portion housing.

\* \* \* \* \*